United States Patent Office 3,383,115
Patented May 14, 1968

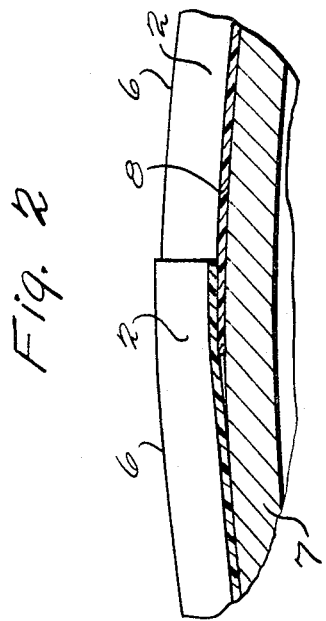
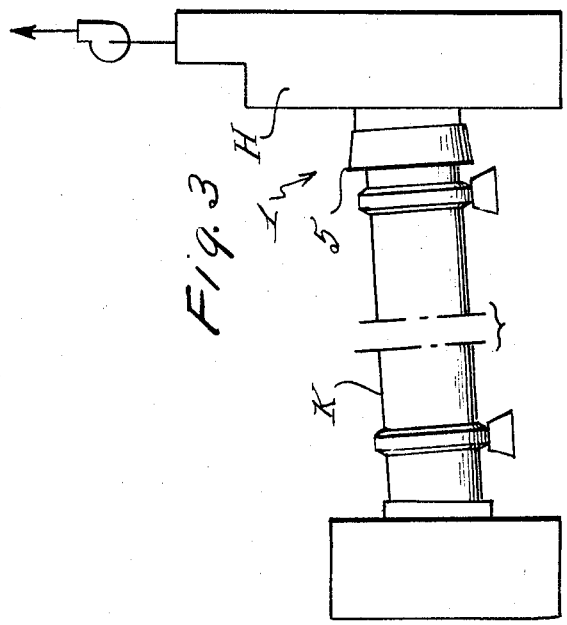
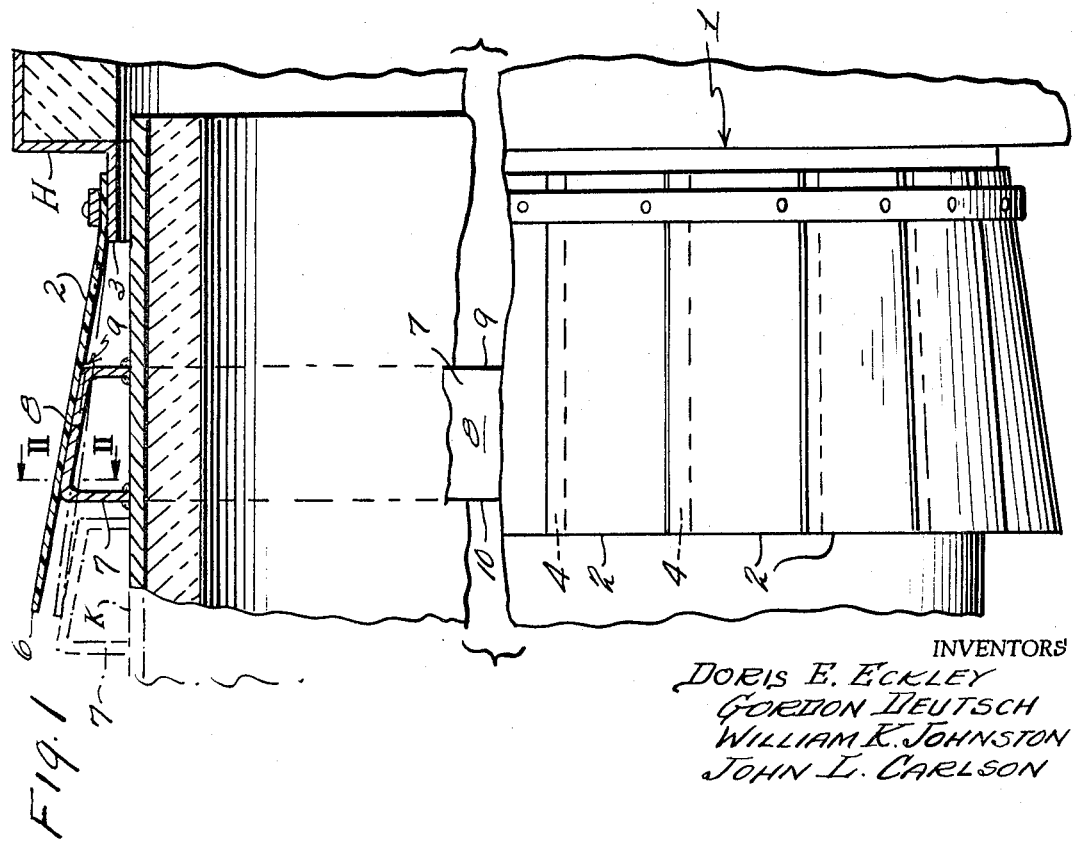
INVENTORS
DORIS E. ECKLEY
GORDON DEUTSCH
WILLIAM K. JOHNSTON
JOHN L. CARLSON

3,383,115
GAS SEAL FOR FURNACES
Doris E. Eckley, Gordon Deutsch, William K. Johnston, and John L. Carlson, Bellefonte, Pa., assignors to National Gypsum Company, Buffalo, N.Y., a corporation of Delaware
Filed Apr. 27, 1965, Ser. No. 451,203
7 Claims. (Cl. 277—81)

ABSTRACT OF THE DISCLOSURE

A seal between one end of a rotary kiln and a stationary housing having an opening in general alignment with the axis of the kiln comprises a seal ring secured around the end of the kiln and a radially flexible sleeve secured to the housing around the opening and engaging a conical surface on the ring. The sleeve is constructed of flexible plates having overlapping longitudinal edges.

---

The present invention relates to the problem of sealing between members of a furnace system and is concerned more particularly with the sealing of communication points of rotary kilns with stationary members of the system.

Previous kiln seals have included complex interengaging iron or steel members in the form of heavy castings or fabrications, usually spring-biased or lever-biased against each other and their respective mountings. Variations have included combinations with gasketing or air or water cooling.

Maintenance and repair of such seals is made difficult by the cumbersome nature of the seal components, which may have diameters of 12 feet, or more, as well as the complexity of aligning the inter-engaging members and the high temperatures normally encountered with rotary kilns.

Also, if there exists any eccentricity, such as occurs with a warped rotary kiln, the resultant eccentric grinding between the several metal rings and wear plates further aggrevates the entire problem.

In general, the seal of the present invention comprises a plurality of flexible plates mounted at one end on a first member, with each plate being positioned to overlap an adjacent plate to form a substantially cylindrical, composite sleeve. At the opposite ends of the plates, they engage a seal ring having a conical surface with its smallest diameter being directed toward the fixed ends of the plates.

A better understanding of the invention may be derived from the following description and the accompanying drawings in which:

FIG. I is a side elevation, partly in section, of the preferred form of seal when installed in a rotary kiln system;

FIG. II is a section, on an enlarged scale, taken on lines II—II of FIG. I, and

FIG. III is a schematic view of the rotary kiln installation.

As shown in the drawings, the seal 1 closes between a rotary kiln K and a stationary housing H. The seal comprises a plurality of flexible plates 2 each secured at one end to a circular surface 3 on the housing. The plates are arranged with an overlap area 4 between the side edges of adjacent plates so that they form a composite cylinder or sleeve 5 of a diameter greater than the kiln K.

The flexible plates 2 preferably are formed of relatively thin, low-friction material, such as graphite-impregnated packing material. However, any suitable material may be selected from the many currently available. They are secured by any suitable means such as the bolted ring shown.

The free ends 6 of the plates 2 engage a tapered or conical seal ring 7 secured on the kiln and having a sealing surface 8 with its narrow portion 9 directed toward the fixed end of the sleeve at the housing H.

The seal ring 7 should be positioned along the kiln at a point at which the sealing surface 8 lies within the sleeve, preferably with the free ends of the plates 2 engaging at or adjacent the larger edge 10 of the conical sealing surface 8, as shown in dotted lines in FIG. I. When the kiln is then put into operation, its longitudinal expansion from the heating will have the effect of moving the seal ring 7 into a face-against-face contact with the plates of the sleeve. The plates slide upon each other to locally expand or laterally telescope the sleeve into a cone substantially conforming to the cone of the seal ring 7.

Where desired, the seal of the present invention may be used for one or more of the stages of a multi-stage seal.

Therefore, the sleeve closes between the kiln and the housing, accommodating both rotational and longitudinal movement, and further is free to compensate for any eccentric movement by the simple sliding of the free plate surfaces upon each other. Any trace leakage which may occur at the joint overlaps of the plates will be negligible to the kiln operation, and will be less than that found with the cumbersome forms of seals.

In the usual induced-draught kiln installation, the flex-pressure of the plates against the seal ring surface is augmented by the lower pressure within the system, tending to further force the plates of the sleeve back to their cylindrical alignment.

Therefore, the seal of the present invention provides the versatility of a flexible-gasket or deformable type seal without the danger of a gasket, which can be twisted and overstressed or torn by rotational drag, and the positive engagement of a rigid seal, without the complexity or cumbersome clumsiness to be found in such seals.

Where desired, the seal of the present invention may be used in known variations such as fluid cooling, inert atmosphere pressurizing or multi-stage seal groups.

Various changes may be made in the details of the invention as described without sacrificing the advantages thereof or departing from the scope of the claims.

We claim:
1. A seal for closure between two relatively rotatable members of a furnacing system comprising a seal ring sealably connected around the periphery of one of the members, the seal ring having a conical sealing surface thereon sloping inwardly toward the other member, a sealing sleeve sealably attached around the periphery of the other member, the sleeve comprising a plurality of flexible plates arranged in edge overlapping relationship to each other, the seal ring being telescopically received within the sealing sleeve, said flexible sealing sleeve sealably engaging the conical surface of the seal ring and exerting a pressure thereon to maintain the sleeve in sealing engagement with the conical sealing surface of the seal ring throughout all horizontal and rotary movement of the members.

2. A seal as set forth in claim 1 in which the flexible plates comprise a lubricant-impregnated deformable material.

3. A seal as set forth in claim 1 in which the furnace system includes induced draft means in communication with the interior of the sleeve, and the exterior of the sleeve is arranged in communication with the atmosphere.

4. A seal means for sealing between a rotary kiln and a stationary housing having an opening for receiving the end of the kiln comprising a seal ring sealably mounted around the periphery of said kiln, a sealing sleeve sealably attached to the housing around the opening therein and extending outwardly toward the rotary kiln, the sealing sleeve comprising a plurality of flexible plates arranged in edge overlapping relationship to each other, said seal ring having a conical sealing surface thereon sloping inwardly toward the stationary housing, said seal ring being telescopically received within the sealing sleeve and maintaining sealing contact around its conical sealing surface with the inside of the sealing sleeve in both the cold and hot position of the kiln.

5. In a furnacing system which includes two furnace members at least one of which is rotatable relative to the other member about an axis passing through the members and sealing means between the members, the improvement in the sealing means which comprises: a first annular sealing element generally concentric to the said axis of rotation and sealingly connected to one of said members, said first sealing element having a conical sealing surface; a second annular sealing element generally concentric to the said axis of rotation, said second sealing element including a plurality of flexible plates arranged with their axially edges overlapping relationship to each other and sealingly connected at one end to the other furnace member whereby said second sealing element is radially flexible, said conical surface of said sealing element being in sealing engagement with an annular portion of said second sealing element at a location spaced along said axis of rotation from said one end of said flexible plates, said conical surface flexing said plates in a generally radial direction whereby said sealing engagement is maintained during relative rotational and longitudinal movement between said furnace members and during relative eccentric movement between said furnace members.

6. Apparatus as in claim 5 wherein said concentric surface on said first annular sealing element is an outer surface on said first sealing element wherein said first sealing element is received within said second annular sealing element and wherein the smaller diameter of said conical surface on said first sealing element is directed toward said one end of said plates.

7. Apparatus as in claim 6 wherein said one furnace member is a rotary kiln and said other furnace member is a stationary housing having an opening therein in general axial alignment with said kiln, wherein said first annular sealing element is a ring secured to the outer periphery of said kiln at the end thereof nearest said opening in said housing, and wherein said second annular sealing element is a sleeve secured to said housing around the periphery of said opening.

References Cited
UNITED STATES PATENTS

| | | | |
|---|---|---|---|
| 1,500,589 | 7/1924 | Lundberg | 263—32 X |
| 2,826,403 | 3/1958 | Moklebust | 263—33 |
| 2,841,385 | 7/1958 | Muller | 263—33 |
| 3,068,015 | 12/1962 | Roubal | 277—81 |

LAVERNE D. GEIGER, *Primary Examiner.*

J. S. MEDNICK, *Assistant Examiner.*